US00H002059H

(19) United States

(12) Statutory Invention Registration (10) Reg. No.: US H2059 H

Ledsham et al. (43) Published: Feb. 4, 2003

(54) SYSTEM AND METHOD FOR MANAGING TERMINAL UNITS IN A WIRELESS SYSTEM

(75) Inventors: Stephen Ledsham, Colorado Springs, CO (US); Abid Inam, Colorado Springs, CO (US)

(73) Assignee: Opuswave Networks, Inc., Colorado Springs, CO (US)

(21) Appl. No.: 09/675,769

(22) Filed: Sep. 29, 2000

(51) Int. Cl.[7] ..... H04Q 7/20

(52) U.S. Cl. ..... 455/466

(56) References Cited

U.S. PATENT DOCUMENTS

| | | | | |
|---|---|---|---|---|
| 5,579,384 | A | 11/1996 | Seymour | 379/243 |
| 5,613,100 | A | 3/1997 | Anezaki | 395/500 |
| 5,652,787 | A | 7/1997 | O'Kelly | 379/112 |
| 5,715,394 | A | 2/1998 | Jabs | 395/200.11 |
| 5,726,979 | A | 3/1998 | Henderson et al. | 370/254 |
| 5,764,955 | A | 6/1998 | Doolan | 395/500 |
| 5,794,009 | A | 8/1998 | Coleman et al. | 395/500 |
| 5,799,153 | A | 8/1998 | Blau et al. | 395/200.53 |
| 5,822,569 | A | 10/1998 | McPartlan et al. | 395/500 |
| 5,862,481 | A | 1/1999 | Kulkarni et al. | 455/432 |
| 5,892,950 | A | 4/1999 | Rigori et al. | 395/705 |
| 5,901,352 | A | 5/1999 | St-Pierre et al. | 455/426 |
| 5,960,176 | A | 9/1999 | Kuroki et al. | 395/200.53 |
| H1836 | H | 2/2000 | Fletcher et al. | 455/433 |
| H1837 | H | 2/2000 | Fletcher et al. | 455/433 |

*Primary Examiner*—Daniel T. Pihulic

(57) ABSTRACT

A communications system includes a base station operable to communicate with a terminal unit over a wireless interface and a packet network coupled to the base station and operable to communicate with the base station. The system also includes a network management system coupled to the packet network. The network management system is operable to generate a management message to manage the terminal unit. The network management system is also operable to transparently communicate the management message to the terminal unit and to transparently receive a response to the management message from the terminal unit.

20 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SYSTEM AND METHOD FOR MANAGING TERMINAL UNITS IN A WIRELESS SYSTEM

CROSS-REFERENCE TO RELATED APPLICATIONS

This application is related to the following applications:

U.S. application Ser. No. 09/128,553, filed on Aug. 3, 1998, by Lynn McKernan and entitled "A 'Plug and Play' Wireless Architecture Supporting Packet Data and IP Voice/Multimedia Services," pending;

U.S. application Ser. No. 09/219,539, filed on Dec. 23, 1998, by Lynn McKernan and entitled "Wireless Local Loop System Supporting Voice/IP," pending; and U.S. application Ser. No. 09/676,055, filed on Sep. 29, 2000, by Stuart P. Kaler and entitled "System and Method for Managing Base Stations in a Wireless System," pending.

TECHNICAL FIELD OF THE INVENTION

This invention relates generally to the field of communications and, more specifically, to a system and method for managing terminal units in a wireless system.

BACKGROUND OF THE INVENTION

Wireless networks typically allow terminal units to transmit and receive information over a wireless interface. Conventional terminal units include wireless telephones and computing devices connected to wireless modems. Base stations communicate with the terminal units over the wireless interface. The base stations establish, maintain, and release communications channels over the wireless interface, and the terminal units communicate with the base stations through the communications channels.

Typical wireless networks include an operations and maintenance center. The operations and maintenance center usually manages the various elements in the wireless networks. However, the operations and maintenance center in a typical wireless network does not manage the terminal units. The architectures of these networks typically do not view the terminal units as manageable entities.

Wireless networks that do manage the terminal units typically have very limited management capabilities. These wireless networks also often use a cascaded management scheme to manage the terminal units. One or more intermediate nodes between the operations and maintenance center and the terminal units perform mediation functions, translating the management messages from one format to another format that is understood by the intermediate node. For example, in conventional wireless networks, the base station controller receives management messages from the operations and maintenance center, translates the messages, and forwards the translated messages to the base station serving a terminal unit.

A problem with this approach is that it increases the complexity of the wireless network. Components in the network typically need to include mediation functionality in order to communicate with other elements in the wireless network. The mediation functionality allows the network components to receive a management message, convert the message into a different protocol, and route the translated message to another element in the network. The mediation functionality makes the network elements more complex, which increases the development time and the expense of each element. This also increases the complexity and expense of the network.

Another problem with this approach is that it increases the load on the network components. The network components typically must receive and process the management messages, converting the messages from one format to another. The network components are unable to process other messages at this time. When a large number of management messages are being sent in the wireless network, elements in the network may spend an excessive amount of time translating the management messages, rather than performing other tasks in the network.

In addition, modularity typically cannot be maintained in the wireless network. The network components usually include proprietary management interfaces, which may prevent some of those components from properly communicating with one another. To properly transport management messages in the network, the components installed in the network need to understand the proprietary interfaces used by other components in the network. If a component cannot understand a proprietary interface in another component, the components may be unable to communicate effectively, and the network may be unable to transport management messages between the components. Because of the proprietary interfaces, a network operator is typically limited in the types of equipment that can be purchased and installed in the network.

SUMMARY OF THE INVENTION

In accordance with the present invention, a system and method for managing terminal units in a wireless system are provided that substantially reduce or eliminate disadvantages and problems associated with previously developed systems and methods.

In one embodiment of the present invention, a communications system includes a base station operable to communicate with a terminal unit over a wireless interface and a packet network coupled to the base station and operable to communicate with the base station. The system also includes a network management system coupled to the packet network. The network management system is operable to generate a management message to manage the terminal unit. The network management system is also operable to transparently communicate the management message to the terminal unit and to transparently receive a response to the management message from the terminal unit.

In another embodiment of the present invention, a method for managing terminal units in a wireless system includes generating a management message for the terminal unit. The method also includes transparently communicating the management message from a network management system to the terminal unit. The method further includes transparently receiving a response to the management message at the network management system from the terminal unit.

Embodiments of the invention provide numerous technical advantages. For example, in one embodiment of the invention, a communications system is provided that manages the terminal units. In this embodiment, the system views the terminal units as manageable entities. A network management system may issue management messages to the terminal units to manage the terminal units in the system.

Some embodiments of the invention also use less complex elements in the network. In a particular embodiment, the system provides protocol layers for direct communications between a network management system and the terminal units. The protocol layers allow management messages to be transported between the network management system and the terminal units transparently. The network management system may manage the terminal units in the system without other intermediate network components, such as base station controllers, performing mediation functions. The components in the system do not require mediation functionality, which reduces the complexity and expense of the components in the system. This also helps reduce the complexity and expense of the communications system.

Some embodiments of the invention also decrease the load on the components in the system. The network management system and the terminal units may communicate transparently across the intermediate system components. These system components are not required to perform any mediation functions, so the components are able to perform other tasks. When a large number of management messages are being sent in the wireless network, the system components are not spending excessive amounts of time translating the management messages.

In addition, some embodiments of the invention help maintain modularity in the network. The components in the system may not need to understand proprietary management interfaces to function properly. By providing protocol layers for communications between the network management system and the terminal units, the management messages may be communicated transparently between those elements, even if proprietary interfaces are used in the network components. Other equipment in the network, like base station controllers, may be installed without determining whether they can perform mediation functions for the management messages. The base stations controllers may properly transport the management messages in the network without understanding the proprietary management interfaces used in other elements in the network.

Other technical advantages are readily apparent to one of skill in the art from the attached Figures, description, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 8 of the drawings, like numerals being used for like and corresponding parts of the various drawings.

Figure 1:
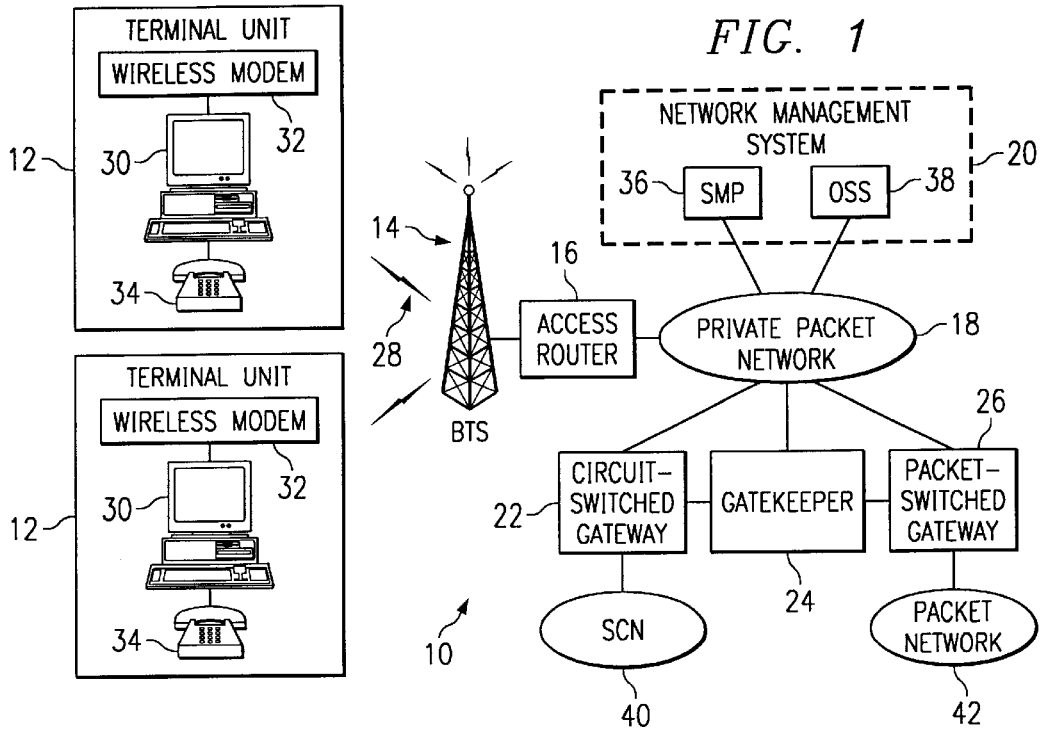
FIG. 1 is a block diagram illustrating an exemplary communications system.

FIG. 1 is a block diagram illustrating an exemplary communications system 10. In the illustrated embodiment, system 10 comprises a plurality of terminal units 12, a base station (BTS) 14, an access router 16, a private packet network 18, a network management system 20, a circuit-switched gateway 22, a gatekeeper 24, and a packet-switched gateway 26. Other embodiments of system 10 may be used without departing from the scope of the present invention.

Each terminal unit 12 communicates with base station 14 over a wireless interface 28. Terminal unit 12 provides packet voice, fax, and/or data services to a subscriber of system 10 by exchanging packets of data with base station 14. Each terminal unit 12 may be uniquely identified in system 10 by a network address, such as an Internet Protocol (IP) address. The network address may be statically or dynamically assigned. Terminal unit 12 may comprise any device capable of communicating with base station 14 over wireless interface 28. Terminal unit 12 could, for example, comprise a computer 30 coupled to a wireless modem 32. Computer 30 may support packet data, fax, and/or voice applications executed by the subscriber. A telephone 34 or a fax machine could also be coupled to computer 30. Other embodiments of terminal unit 12 may be used without departing from the scope of the present invention. For example, terminal unit 12 could also comprise a mobile telephone, such as a Global System for Mobile communication (GSM) mobile station.

Wireless interface 28 communicatively couples terminal unit 12 and base station 14. In this document, the term "wireless" designates the use of a radio or over-the-air interface to communicate with terminal unit 12. Wireless interface 28 may comprise any suitable circuit-switched or packet-switched wireless interface. Wireless interface 28 may, for example, comprise a GSM Enhanced Data rates for GSM Evolution (GSM/EDGE) interface.

Base station 14 is coupled to access router 16. In this document, the term "couple" refers to any direct or indirect connection between two or more elements in system 10, whether or not those elements physically contact one another. Base station 14 provides bi-directional communication with one or more terminal units 12 in a specified geographic area. For example, base station 14 transmits and receives packet messages to and from terminal units 12 over wireless interface 28. Base station 14 also transmits and receives packet messages to and from private network 18 through access router 16. Each base station 14 may be uniquely identified in system 10 by a network address, such as an IP address. The network address may be statically or dynamically assigned. Base station 14 may comprise any suitable device operable to facilitate communication with terminal units 12. Base station 14 may, for example, comprise one or more radio transceivers capable of transmitting packet-switched messages to and receiving messages from terminal unit 12 over wireless interface 28.

Access router 16 is coupled to base station 14 and private network 18. Access router 16 routes packets containing voice, fax, and/or data traffic in system 10. Access router 16 receives packets from base station 14 and routes the packets over private network 18. Access router 16 also receives packets from private network 18 for a terminal unit 12 served by base station 14, and access router 16 routes the packets to base station 14. Access router 16 may comprise any suitable device operable to route messages over private network 18. Access router 16 could, for example, comprise a wireless router and concentrator.

Private network 18 is coupled to access router 16, network management system 20, circuit-switched gateway 22, gatekeeper 24, and packet-switched gateway 26. Private network 18 facilitates communication between components in system 10 by transferring messages between the components. Private network 18 may comprise any suitable packet network, such as a local area network (LAN), a metropolitan area network (MAN), a wide area network (WAN), or any other communications system or systems at one or multiple locations.

Network management system 20 provides management functionality in system 10. Network management system 20 may communicate with other components in system 10 over a management plane. The management plane carries management messages between network management system 20 and the components in system 10. In the illustrated embodiment, network management system 20 comprises a subscriber management platform (SMP) 36 and an operations support system (OSS) 38.

SMP 36 is coupled to private network 18. SMP 36 provides subscriber management and billing functionality in system 10. This may include, for example, authentication functionality to protect against fraud and customer registration functionality to collect customer data used in provisioning services and billing customers. This may also include rating functionality to create flexible pricing plans for subscribers, billing functionality to generate real-time or invoice customer bills, and customer management functionality to provide access to customer profiles, activities, and account balances. SMP 36 may comprise any suitable device operable to provide subscriber management functionality.

OSS 38 is coupled to private network 18. OSS 38 provides network management functionality to manage the components in system 10. This may include, for example, provisioning, administration, status, and performance monitoring functionality for the networks components in system 10. This may also include configuration, fault, and security management. OSS 38 may comprise any suitable device operable to provide network management functionality. In one embodiment, OSS 38 may be identified by a network address, such as a statically or dynamically assigned IP address.

Circuit-switched gateway 22 is coupled to private network 18, gatekeeper 24, and a public switched circuit network (SCN) 40. SCN 40 may comprise any suitable circuit-switched network, such as a public switched telephone network (PSTN) or an integrated services digital network (ISDN). Gateway 22 facilitates communication between system 10 and SCN 40 by transferring messages between private network 18 and SCN 40. Gateway 22 also performs an interworking function to translate between the packet-switched transmission and signaling protocols used by private network 18 and the circuit-switched protocols used by SCN 40. In one embodiment, system 10 uses the protocols defined by the International Telecommunications Union—Telecommunications (ITU-T) H.323 standard, and gateway 22 interworks the H.323 signaling protocols with the circuit switched protocols of SCN 40. Gateway 22 may comprise any suitable device operable to facilitate communication between system 10 and SCN 40. Gateway 22 may, for example, comprise an H.323 gateway.

Gatekeeper 24 is coupled to private network 18, circuit-switched gateway 22, and packet-switched gateway 26. Gatekeeper 24 provides call control services in system 10. This may include, for example, tracking the location of each terminal unit 12 and routing messages to and from the base station 14 currently serving a particular terminal unit 12. This may also include address translation to map between the telephone number and current IP address of a terminal unit 12. Gatekeeper 24 may comprise any suitable device operable to provide call control services in system 10. In one embodiment, gatekeeper 24 comprises an H.323 gatekeeper.

Packet-switched gateway 26 is coupled to private network 18, gatekeeper 24, and a public packet-switched network 42. Public packet-switched network 42 may comprise any suitable packet-switched network, such as the Internet, a LAN, a MAN, a WAN, or any other communications system or systems in one or multiple locations. Packet-switched gateway 26 facilitates communication between system 10 and public network 42 by transferring messages between private network 18 and public network 42. Gateway 26 may comprise any suitable device operable to facilitate communication between system 10 and public network 42. Gateway 26 may, for example, comprise an access router that supports routing and firewalling functionality.

In operation, network management system 20 manages base stations 14 by transmitting management messages to base stations 14 over private network 18. Network management system 20 also manages terminal units 12 by transmitting management messages to terminal units 12 over private network 18 and wireless interface 28. In one embodiment, network management system 20 communicates the management messages to terminal units 12 and/or base stations 14 transparently in system 10. In this document, the term "transparently" refers to a communication between two elements in system 10, where components in system 10 that link the two elements do not perform a mediation function to translate the management messages. Network management system 20 and base station 14 may communicate transparently across private network 18. Network management system 20 and terminal unit 12 may also communicate transparently over private network 18 and wireless interface 28. The components in system 10 that link network management system 20, terminal units 12, and base stations 14 do not perform a mediation function to translate the management messages.

Figure 2:
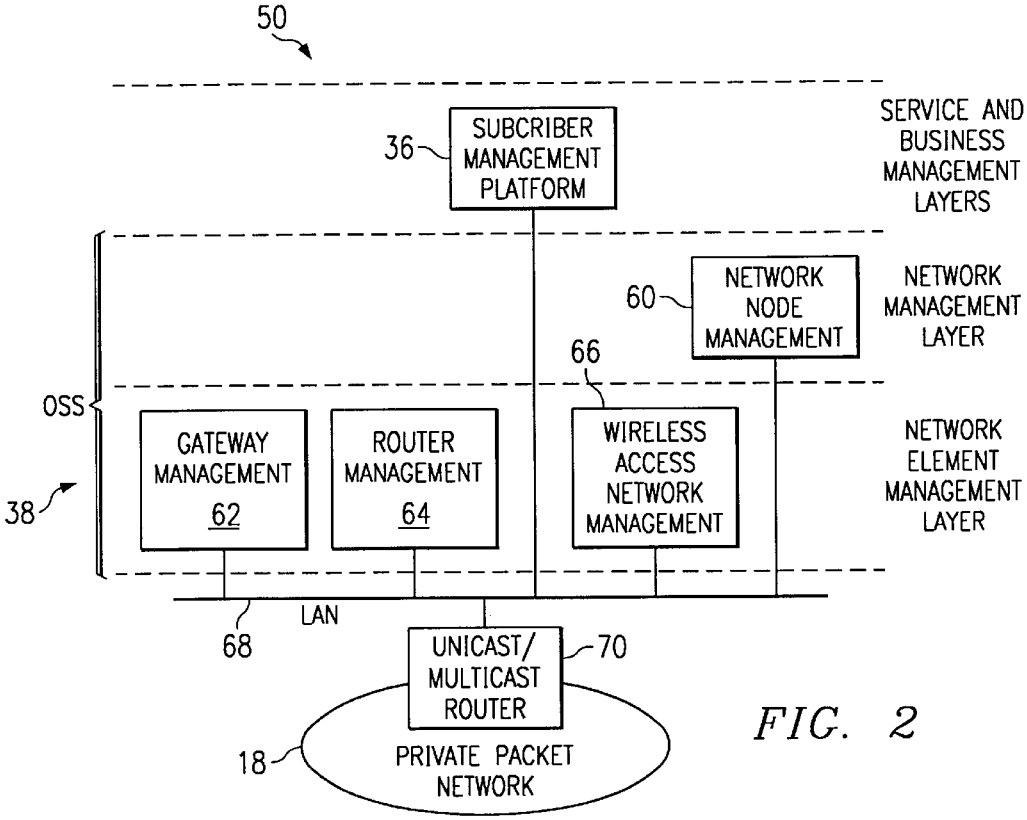
FIG. 2 is a block diagram illustrating an exemplary network management architecture for the communications system of FIG. 1.

FIG. 2 is a block diagram illustrating an exemplary network management architecture 50 for communications system 10 of FIG. 1. In the illustrated embodiment, network management architecture 50 comprises SMP 36, a network node management (NNM) platform 60, a gateway management platform 62, a router management platform 64, a wireless access network management platform 66, a local area network (LAN) 68, and a router 70. Other embodiments of network management architecture 50 may be used without departing from the scope of the present invention.

NNM platform 60 is coupled to LAN 68. NNM platform 60 provides an integrated management platform for the various components in system 10, such as terminal units 12, base stations 14, routers 16, and gateways 22 and 26. NNM platform 60 provides network management functionality such as configuration, fault, performance monitoring, event management, database control, general security, trouble management, and asset management functionality. In addition, NNM platform 60 may provide application programming interfaces (APIs) that allow additional applications to be executed on NNM platform 60. These additional applications could include, for example, analysis tools used in system 10. NNM platform 60 may comprise any suitable device operable to provide integrated network management in system 10.

Gateway management platform 62 is coupled to LAN 68. Gateway management platform 62 provides management functionality to control circuit-switched gateway 22. Gateway management platform 62 may provide provisioning, administration, status, and performance monitoring functionality for gateway 22. Gateway management platform 62 may comprise any suitable device operable to provide management functionality for gateway 22. Gateway management platform 62 could, for example, comprise an H.323 gateway management platform.

Router management platform 64 is coupled to LAN 68. Router management platform 64 provides management functionality to control access routers 16, packet-switched gateway 26, and router 70 in system 10. Router management platform 64 may provide provisioning, administration, status, and performance monitoring functionality for routers 16 and 70 and gateway 26. Router management platform 64 may comprise any suitable device operable to provide management functionality for routers 16 and 70 and gateway 26.

Wireless access network management platform 66, also called a wireless management platform, is coupled to LAN 68. Wireless management platform 66 provides management functionality to control terminal units 12 and base stations 14 in system 10. Wireless management platform 66 may comprise any suitable device operable to provide management functionality for terminal units 12 and base stations 14 in system 10.

LAN 68 couples NNM platform 60, gateway management platform 62, router management platform 64, and wireless management platform 66 to router 70. LAN 68 facilitates communication between components in network management architecture 50 and system 10. LAN 68 may, for example, transfer management messages between components in network management architecture 50 and router 70. LAN 68 may comprise any suitable packet network.

Router 70 is coupled to LAN 68 and private packet network 18. Router 70 facilitates communication between network management architecture 50 and system 10. Router 70 may, for example, transfer management messages between LAN 68 and components of system 10 coupled to private network 18. Router 70 may comprise any suitable device operable to route management messages over private network 18. Router 70 may, for example, comprise a unicast router or a multicast router.

In operation, router 70 receives management messages for terminal units 12 and/or base stations 14 from wireless management platform 66, and router 70 routes the messages over private network 18. Router 70 also receives responses and messages from terminal units 12 and/or base stations 14, and router 70 routes the messages to wireless management platform 66 over LAN 68.

Router 70 routes management messages to base stations 14 using the network address of base stations 14. In one embodiment, router 70 comprises a unicast router, and router 70 routes management messages to a base station 14 using the network address of that base station 14. In another embodiment, router 70 comprises a multicast router, and router 70 may route a management message to one base station 14 or groups of base stations 14. Multicast router 70 may also broadcast the message to all base stations 14. In a particular embodiment, each base station 14 supports the Internet Group Membership Protocol, which allows base stations 14 to inform multicast router 70 of the group membership of each base station 14.

Similarly, router 70 routes management messages to terminal units 12 using the network address of terminal units 12. In one embodiment, router 70 comprises a unicast router, and router 70 routes management messages to a terminal unit 12 using the network address of that terminal unit 12. In another embodiment, router 70 comprises a multicast router, and router 70 may route a management message to one terminal unit 12, groups of terminal units 12, or all terminal units 12. In a particular embodiment, each terminal unit 12 supports the Internet Group Membership Protocol, which allows terminal units 12 to inform multicast router 70 of the group membership of each terminal unit 12.

Figure 3:
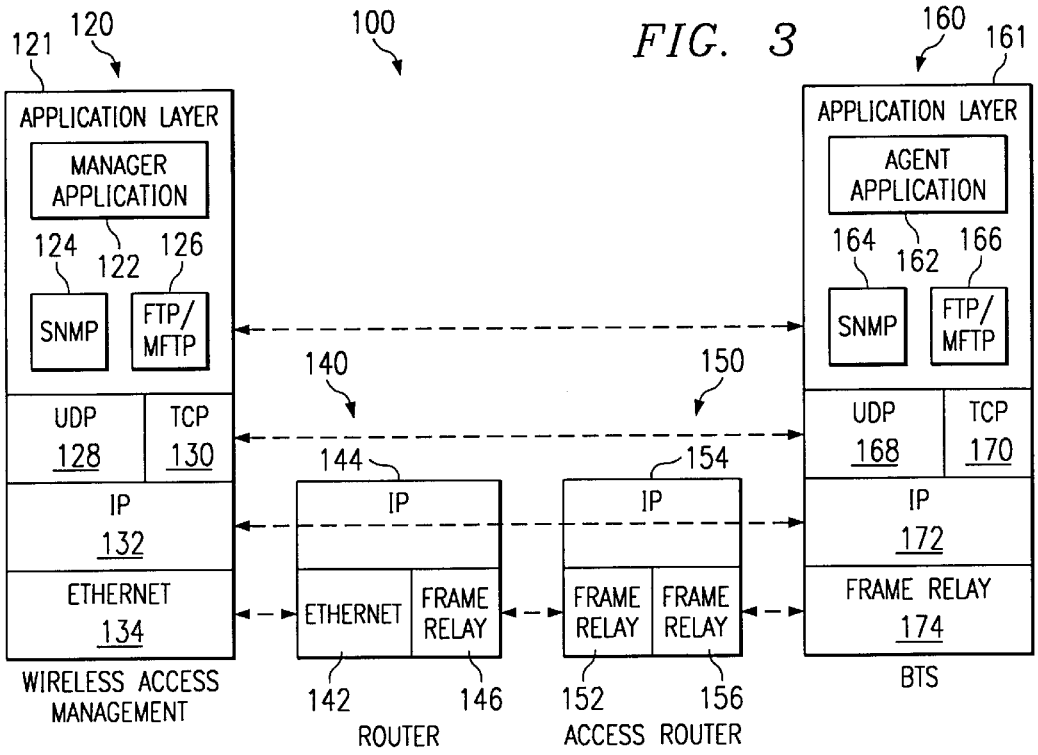
FIG. 3 is a block diagram illustrating an exemplary management protocol architecture for managing base stations in the communications system of FIG. 1.

FIG. 3 is a block diagram illustrating an exemplary management protocol architecture 100 for managing base stations 14 in communications system 10 of FIG. 1. In the illustrated embodiment, management protocol architecture 100 comprises a wireless access management protocol stack 120, a router protocol stack 140, an access router protocol stack 150, and a base station protocol stack 160. Other embodiments of management protocol architecture 100 may be used without departing from the scope of the present invention.

Wireless access management protocol stack 120 comprises an application layer 121, a User Datagram Protocol (UDP) layer 128, a Transmission Control Protocol (TCP) layer 130, an Internet Protocol (IP) layer 132, and an Ethernet layer 134. Application layer 121 comprises a manager application 122, a Simple Network Management Protocol (SNMP) entity 124, and a File Transfer Protocol / Multicast File Transfer Protocol (FTP/MFTP) entity 126.

Router protocol stack 140 comprises an Ethernet layer 142, an IP layer 144, and a frame relay layer 146. Access router protocol stack 150 comprises a frame relay layer 152, an IP layer 154, and a frame relay layer 156. Base station protocol stack 160 comprises an application layer 161, a UDP layer 168, a TCP layer 170, an IP layer 172, and a frame relay layer 174. Application layer 161 comprises an agent application 162, a SNMP entity 164, and a FTP/MFTP entity 166.

Application layers 121 and 161 support the execution of management applications 122 and 162 to manage base stations 14 in system 10. In one embodiment, system 10 uses a Telecommunications Management Network (TMN) architecture. In this embodiment, communications between application layers 121 and 161 occur across TMN interfaces that use a manager-agent relationship. In a particular embodiment, system 10 adheres to the TMN principles in the International Telegraph and Telephone Consultative Committee (CCITT) Recommendation M.3010, entitled "Principles of a Telecommunications Management Network."

Applications 122 and 162 use SNMP entities 124 and 164 and FTP/MFTP entities 126 and 166 to manage base stations 14. SNMP entities 124 and 164 support network management operations, and FTP/MFTP entities 126 and 166 support file transfer operations in system 10. Applications 122 and 162 may use SNMP entities 124 and 164 and FTP/MFTP entities 126 and 166 to construct complex management operations.

UDP layers 128 and 168, along with IP layers 132, 144, 154, and 172, support the use of UDP/IP connections between wireless management platform 66 and base stations 14. TCP layers 130 and 170, along with IP layers 132, 144, 154, and 172, support the use of TCP/IP connections between wireless management platform 66 and base stations 14. SNMP entities 124 and 164 use the UDP/IP connections to transport SNMP messages in system 10. FTP/MFTP entities 126 and 166 also use the UDP/IP connections to perform multicasting operations, while FTP/MFTP entities 126 and 166 use the TCP/IP connections to transport negative acknowledgement signals from base stations 14.

Ethernet layers 134 and 142 support the physical communications link between wireless management platform 66 and router 70. Frame relay layers 146 and 152 support the physical communications link between router 70 and access router 16. Frame relay layers 156 and 174 support the physical communications link between access router 16 and base station 14. In one embodiment, frame relay layers 146, 152, 156, and 174 may not support multicast operations, and point-to-multipoint routing is performed in IP layers 144, 154, and 172 using a separate virtual circuit for each base station 14.

As illustrated in FIG. 3, router 70 and access router 16 transport management messages between wireless management platform 66 and base station 14 without performing any mediation functions. The management messages pass transparently between wireless management platform 66 and base station 14. This allows system 10 to use less complex components since the components do not require mediation functionality. It also decreases the load on router 70 and access router 16 because they are not required to perform mediation functions, so router 70 and access router 16 are able to perform other tasks. Further, router 70 and access router 16 may not need to understand proprietary management interfaces used by other components to properly transport the management messages in system 10.

Figure 4:
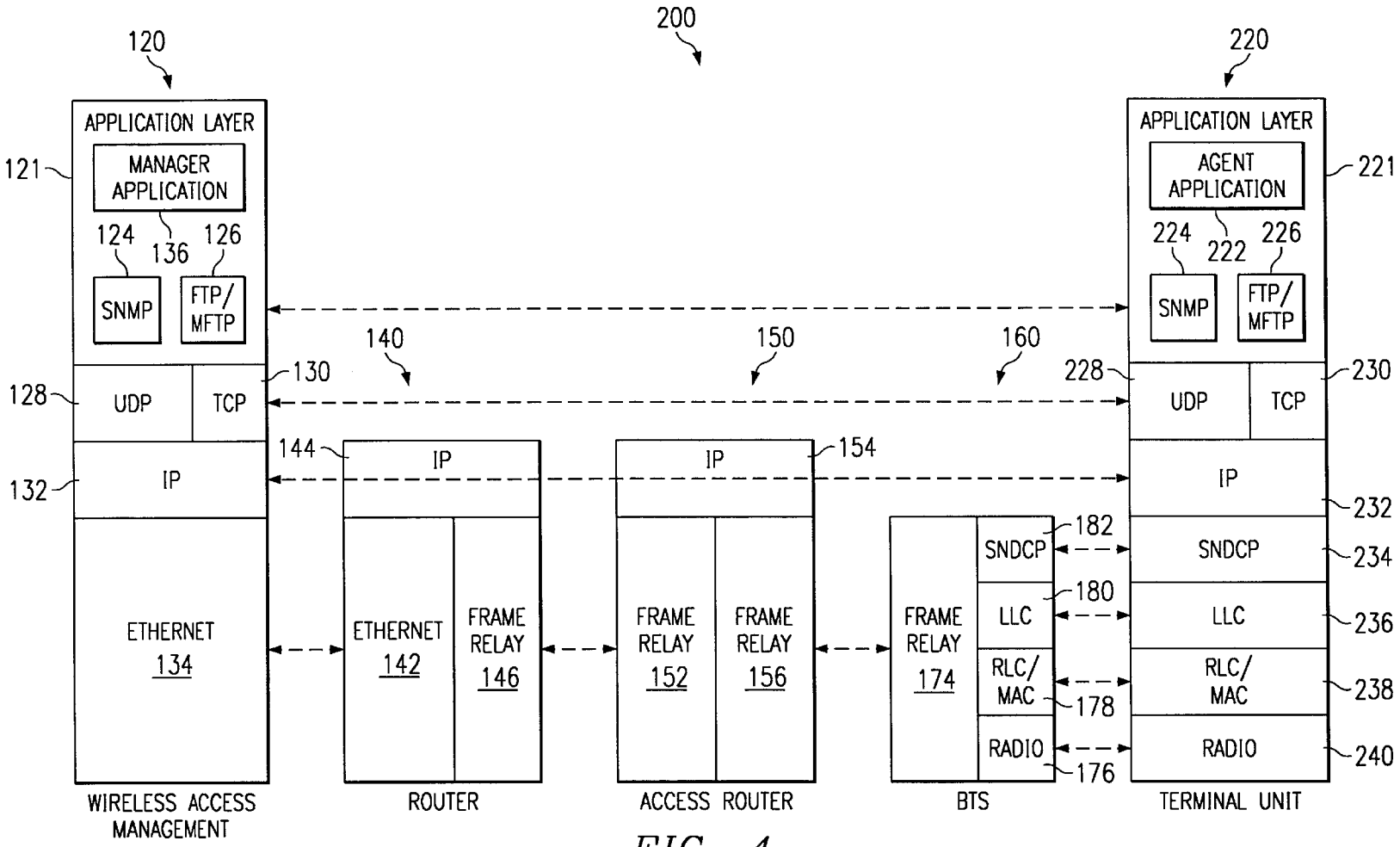
FIG. 4 is a block diagram illustrating an exemplary management protocol architecture for managing terminal units in the communications system of FIG. 1.

FIG. 4 is a block diagram illustrating an exemplary management protocol architecture 200 for managing terminal units 12 in communications system 10 of FIG. 1. In the illustrated embodiment, management protocol architecture 200 comprises wireless access management protocol stack 120, router protocol stack 140, access router protocol stack 150, base station protocol stack 160, and a terminal unit protocol stack 220. Other embodiments of management protocol architecture 200 may be used without departing from the scope of the present invention.

Management protocol architecture 200 uses several protocol layers in wireless access management protocol stack 120, router protocol stack 140, access router protocol stack 150, and base station protocol stack 160 from management protocol architecture 100. In addition, wireless access management protocol stack 120 comprises another application manager application 136. Base station protocol stack 160 further comprises a radio interface layer 176, a Radio Link Control / Medium Access Control (RLC/MAC) layer 178, a Logical Link Control (LLC) layer 180, and a Subnetwork Dependent Convergence Protocol (SNDCP) layer 182. Terminal unit protocol stack 220 comprises an application layer 221, a UDP layer 228, a TCP layer 230, an IP layer 232, a SNDCP layer 234, a LLC layer 236, a RLC/MAC layer 238, and a radio interface layer 240. Application layer 221 comprises an agent application 222, a SNMP entity 224, and a FTP/MFTP entity 226.

Application layers 121 and 221 support the execution of management applications 136 and 222 to manage terminal units 12. SNMP entities 124 and 224 support network management operations, and FTP/MFTP entities 126 and 226 support file transfers in system 10. Applications 136 and 222 may use SNMP entities 124 and 224 and FTP/MFTP entities 126 and 226 to construct complex management operations to provide broad management capabilities over terminal units 12.

UDP layers 128 and 228, along with IP layers 132, 144, 154, and 232, support the use of UDP/IP connections between wireless management platform 66 and terminal units 12. TCP layers 130 and 230, along with IP layers 132, 144, 154, and 232, support the use of TCP/IP connections between wireless management platform 66 and terminal units 12. SNMP entities 124 and 224 use the UDP/IP connections to transport SNMP messages in system 10. FTP/MFTP entities 126 and 226 also use the UDP/IP connections to perform multicasting operations, while FTP/MFTP entities 126 and 226 use the TCP/IP connections to transport negative acknowledgement signals from terminal units 12. Frame relay layers 146, 152, 156, and 162 may not support multicast operations, so point-to-multipoint routing may be performed in IP layers 144 and 154 using a separate virtual circuit for each base station 14. Base station 14 then forwards the messages to the appropriate terminal unit 12.

Radio interface layers 176 and 240 manage wireless interface 28 between terminal unit 12 and base station 14. RLC/MAC layers 178 and 238 support the transfer of information over radio interface layers 176 and 240. RLC/MAC layers 178 and 238 may, for example, map LLC frames from LLC layers 180 and 236 onto RLC frames transmitted over wireless interface 28. LLC layers 180 and 236 provide a reliable ciphered logical link between terminal unit 12 and base station 14, and messages are transferred between LLC layers 180 and 236 in LLC frames. SNDCP layers 182 and 234 map messages having a network-level protocol, such as an IP protocol, onto LLC frames for transport between terminal unit 12 and base station 14. SNDCP layers 182 and 234 also perform encryption, header compression, and data compression of network-layer messages.

As illustrated in FIG. 4, base station 14, access router 16, and router 70 transport management messages between wireless management platform 66 and terminal units 12 without performing any mediation functions. The management messages pass transparently between wireless management platform 66 and terminal units 12. This also allows system 10 to use less complex components and to decrease the load on base stations 14, access router 16, and router 70. It also allows base stations 14, access router 16, and router 70 to transport management messages in system 10 without understanding proprietary interfaces used by the components in system 10.

Figure 5:
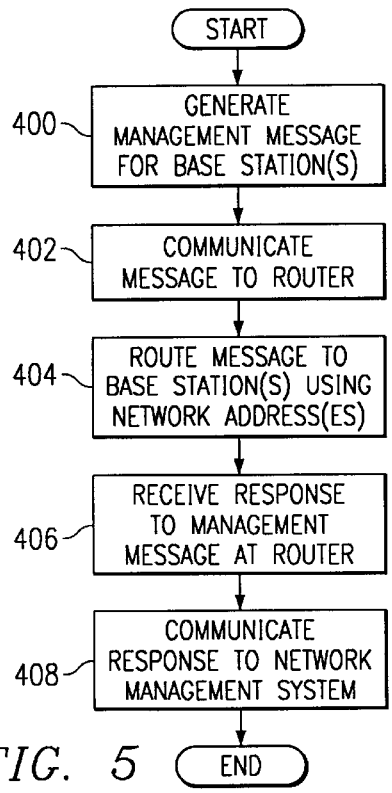
FIG. 5 is a flow diagram illustrating an exemplary method for managing base stations at a network management system.

FIG. 5 is a flow diagram illustrating an exemplary method for managing base stations 14 at network management system 20. Network management system 20 generates a management message for one or more base stations 14 at a step 400. This may include, for example, wireless management platform 66 generating the message. Wireless management platform 66 communicates the management message to router 70 at a step 402. Router 70 transparently routes the management message to one or more of the base stations 14 at a step 404. This may include, for example, router 70 routing the message over packet network 18 to access routers 16 coupled to base stations 14. Router 70 may use the network addresses of the base stations 14 to route the message to base stations 14. Router 70 may also use Internet Group Messaging Protocol messages received from base stations 14 to multicast the management message to base stations 14. Router 70 receives a response to the management message at a step 406. The response may be communicated transparently from base station 14. Router 70 communicates the response to wireless management platform 66 at a step 408. This may include, for example, router 70 communicating the response over LAN 68 to wireless management platform 66.

Figure 6:
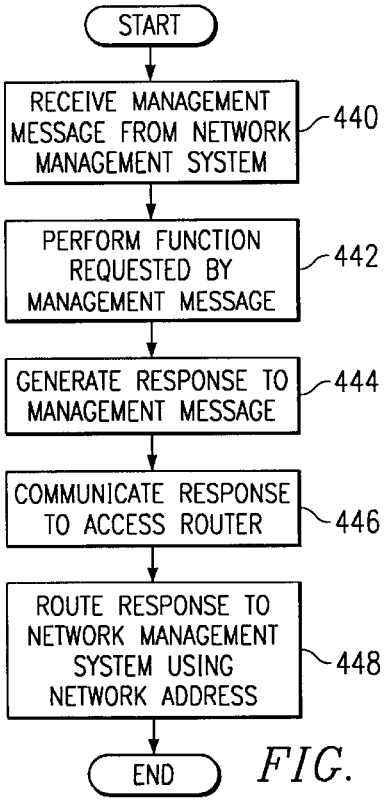
FIG. 6 is a flow diagram illustrating an exemplary method for responding to a management message at a base station.

FIG. 6 is a flow diagram illustrating an exemplary method for responding to a management message at base station 14.

Base station 14 receives a management message from network management system 20 at a step 440. This may include, for example, access router 16 receiving the management message over private network 18 and forwarding the message to base station 14. Base station 14 performs a function requested by the management message at a step 442. The function may comprise any suitable management function capable of execution by base station 14. This may include, for example, base station 14 determining a current status of each transceiver in base station 14.

Base station 14 generates a response to the management message at a step 444. The response may indicate that base station 14 performed some action, or the response may include information requested by network management system 20. Base station 14 transparently communicates the response to network management system 20. Base station 14 communicates the response to access router 16 at a step 446, and access router 16 routes the response to network management system 20 at a step 448. This may include, for example, access router 16 routing the response to network management system 20 using the network address of OSS 38.

Figure 7:
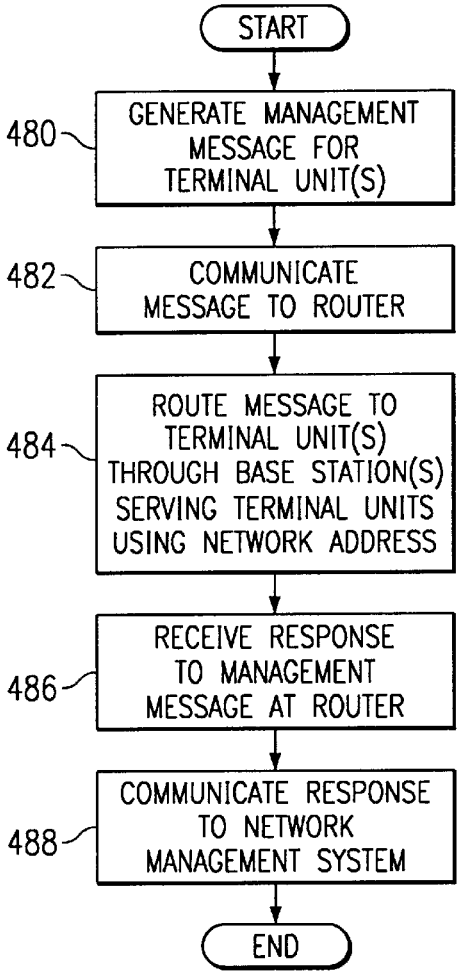
FIG. 7 is a flow diagram illustrating an exemplary method for managing terminal units at a network management system.

FIG. 7 is a flow diagram illustrating an exemplary method for managing terminal units 12 at network management system 20. Network management system 20 generates a management message for one or more terminal units 12 at a step 480. This may include, for example, wireless management platform 66 generating the message. Wireless management platform 66 communicates the management message to router 70 at a step 482. Router 70 routes the management message to one or more of the terminal units 12 at a step 484. This may include, for example, router 70 routing the message to base stations 14 that are currently serving terminal units 12. Router 70 may use the network addresses of the terminal units 12 to route the message to terminal units 12. Router 70 may also use Internet Group Messaging Protocol messages received from terminal units 12 to multicast the management message to terminal units 12. Router 70 receives a response to the management message at a step 486. The response may be communicated transparently from base station 14. Router 70 communicates the response to wireless management platform 66 at a step 488. This may include, for example, router 70 communicating the response over LAN 68 to wireless management platform 66.

Figure 8:
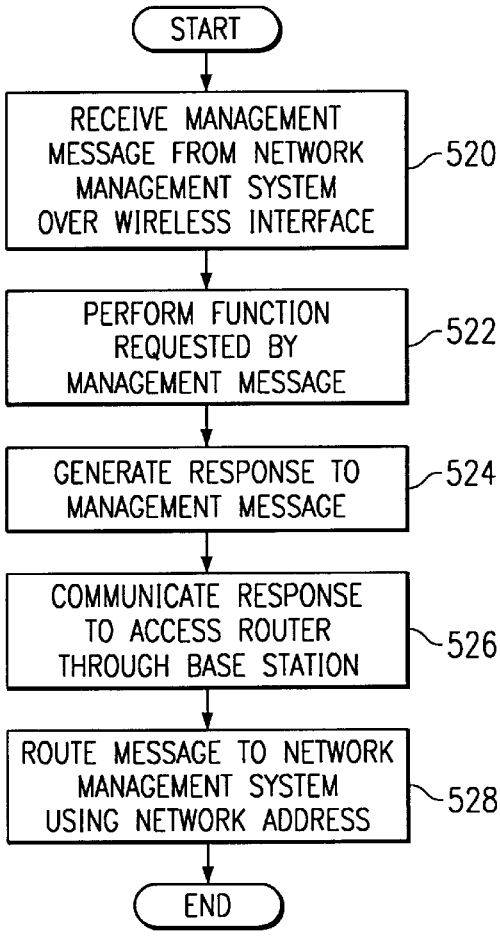
FIG. 8 is a flow diagram illustrating an exemplary method for responding to a management message at a terminal unit.

FIG. 8 is a flow diagram illustrating an exemplary method for responding to a management message at terminal unit 12. Terminal unit 12 receives a management message from network management system 20 at a step 520. This may include, for example, access router 16 receiving the management message over private network 18 and communicating the message to base station 14 serving terminal unit 12, and base station 14 communicating the message to terminal unit 12 over wireless interface 28. Terminal unit 12 performs a function requested by the management message at a step 522. The function may comprise any suitable management function capable of execution by terminal unit 12. This may include, for example, determining a current status of terminal unit 12.

Terminal unit 12 generates a response to the management message at a step 524. The response may indicate that terminal unit 12 performed some action, or the response may include information requested by network management system 20. Terminal unit 12 transparently communicates the response to network management system 20. Terminal unit 12 communicates the response to access router 16 through base station 14 at a step 526, and access router 16 routes the response to network management system 20 at a step 528. This may include, for example, access router 16 routing the response to network management system 20 using the network address of OSS 38.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for managing terminal units in a wireless system, comprising:

generating a management message for the terminal unit;

transparently communicating the management message from a network management system to the terminal unit; and transparently receiving a response to the management message at the network management system from the terminal unit.

2. The method of claim 1, wherein communicating the message to the terminal unit comprises communicating the message to a router coupled to a packet network.

3. The method of claim 2, wherein communicating the message to the terminal unit further comprises:

communicating the management message from the router to a base station coupled to the packet network; and communicating the management message from the base station to the terminal unit over a wireless interface.

4. The method of claim 1, wherein communicating the message to the terminal unit comprises communicating the message to the terminal unit using an Internet Protocol address of the terminal unit.

5. The method of claim 1, wherein communicating the message to the terminal unit comprises multicasting the message to a plurality of terminal units.

6. The method of claim 5, further comprising receiving an Internet Group Membership Protocol (IGMP) message from each terminal unit, and wherein multicasting the message to the plurality of terminal units comprises multicasting the messages to the plurality of terminal units using the IGMP messages from the terminal units.

7. The method of claim 1, wherein receiving a response to the management message from the terminal unit comprises transparently receiving a response to the management message from each of the plurality of terminal units.

8. A communications system, comprising:

a base station operable to communicate with a terminal unit over a wireless interface;

a packet network coupled to the base station and operable to communicate with the base station; and a network management system coupled to the packet network, the network management system operable to generate a management message to manage the terminal unit, the network management system also operable to transparently communicate the management message to the terminal unit and to transparently receive a response to the management message from the terminal unit.

9. The communications system of claim 8, wherein the packet network comprises an Internet Protocol network.

10. The communications system of claim 8, wherein the network management system comprises:

a gateway management platform operable to manage a circuit-switched gateway coupled to the packet network;

a router management platform operable to manage a router coupled to the packet network; and a wireless management platform operable to manage the base station and the terminal unit.

11. The communications system of claim 8, further comprising a router coupled to the network management system and the packet network, the router operable to communicate the management message to the terminal unit through the base station and to receive the response from the terminal unit through the base station.

12. The communications system of claim 11, wherein the terminal unit comprises a first terminal unit;

further comprising a second terminal unit operable to communicate with the base station over the wireless interface; and wherein the router comprises a multicast router operable to communicate the management message to the first and second terminal units.

13. The communications system of claim 12, wherein the network management system is operable to transparently receive a response to the management message from the first and second terminal units.

14. The communications system of claim 8, further comprising:

a circuit-switched gateway coupled to the packet network and operable to communicate with a circuit-switched network; and a packet-switched gateway coupled to the packet network and operable to communicate with another packet network.

15. A network management system for managing terminal units in a wireless system, comprising:

a router operable to communicate with a base station through a packet network, the base station operable to communicate with the terminal unit over a wireless interface; and a wireless management platform coupled to the router, the wireless management platform operable to generate a management message to manage the terminal unit, the wireless management platform also operable to transparently communicate the management message to the terminal unit and to transparently receive a response to the management message from the terminal unit.

16. The network management system of claim 15, further comprising a local area network coupled to the router and the wireless management platform, the local area network operable to transfer the management message and the response between the wireless management platform and the router.

17. The network management system of claim 15, wherein the router communicates the message to the terminal unit using an Internet Protocol address of the terminal unit.

18. The network management system of claim 15, wherein the router comprises a multicast router operable to multicast the management message to a plurality of terminal units.

19. The network management system of claim 18, wherein the wireless management platform is operable to transparently receive a response to the management message from each of the plurality of terminal units.

20. The network management system of claim 15, further comprising:

a router management platform coupled to the router and operable to manage the router; and a gateway management platform coupled to the router and operable to manage a circuit-switched gateway coupled to the packet network.

* * * * *